United States Patent Office 3,273,451
Patented Sept. 20, 1966

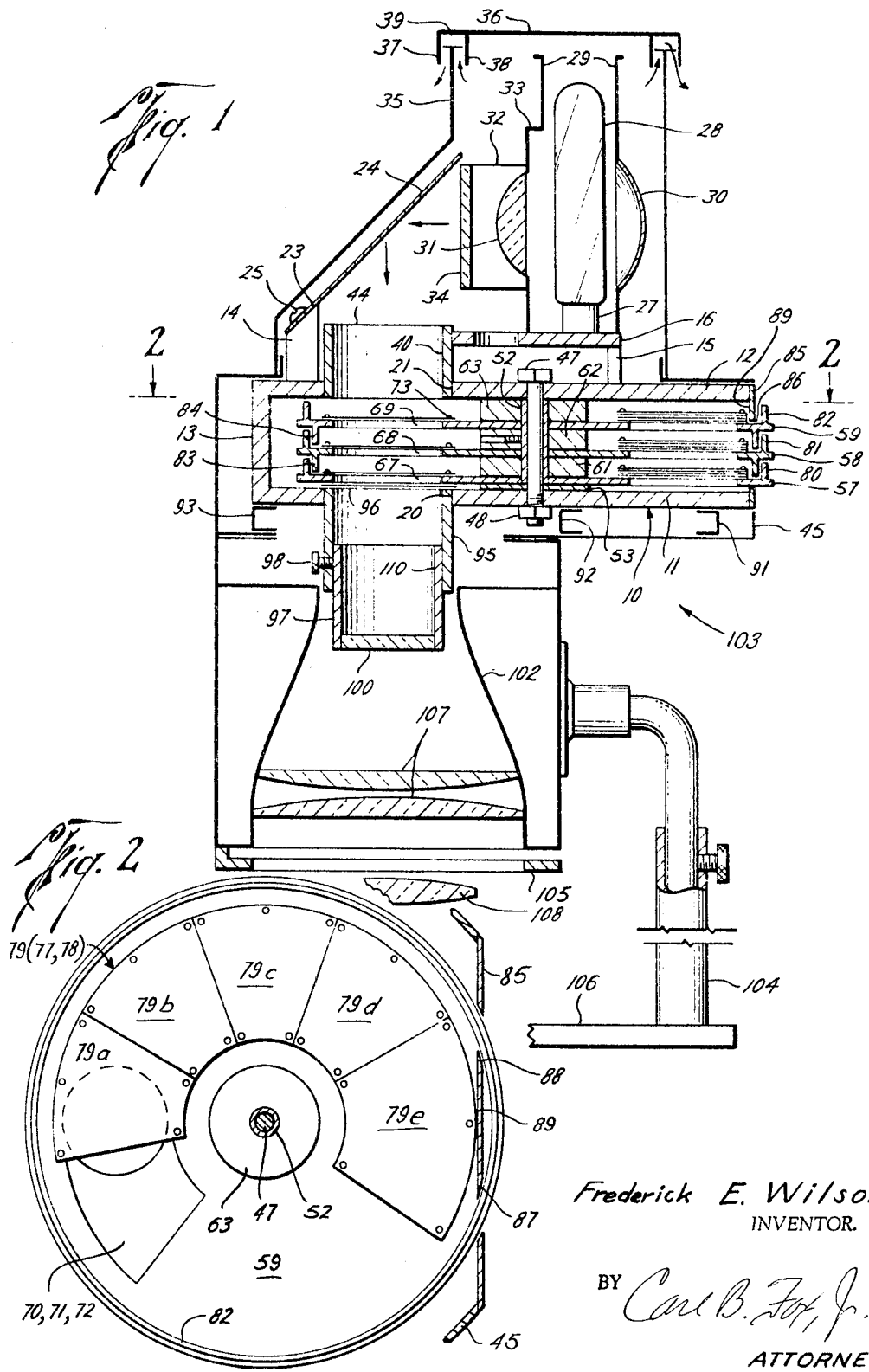

3,273,451
PHOTOGRAPHIC APPARATUS
Frederick E. Wilson, 10103 Willowgrove, Houston, Tex.
Filed Dec. 17, 1963, Ser. No. 331,201
8 Claims. (Cl. 88—24)

This invention pertains to photographic enlargers and to color heads for enlargers used in making colored photographic prints.

A principal object of the invention is to provide improved color head apparatus for supplying light to enlargers used in making colored photographic prints.

Another object of the invention is to provide such apparatus which gives superior performance and which is relatively simple in operation.

Still another object of the invention is to provide such apparatus which provides enlarger light of accurate color balance and uniform distribution, whereby colored photographic prints made therewith will be of improved and uniform quality.

An additional object of the invention is to provide such apparatus which can be produced at relatively low cost by average artisans, yet which will have superior accuracy, uniformity, and dependability.

Various apparatuses have been employed in conjunction with photographic enlargers for the production of uniform color-balanced light supplies to the enlarger. Most color heads include colored filters for introducing color components into a beam or shaft of light to improve the color balance of the light with respect to the color negative. Virtually all color negatives have some color balance difficulties, especially with regard to making color prints therefrom, and it is usual to attempt to correct these difficulties by making color balance adjustments to the light used in the printer or enlarger.

With conventional equipment, it has never been possible to fully solve all of these difficulties, and even with very expensive and complex equipment fully satisfactory results have not always been obtained. One basic problem of color heads for supplying enlarger light is that of making the light of uniform color at all areas of the supply and with each color component present in the exact amount required. Various arrangements of lenses, color filters and light diffusing and reflecting devices have been made, but except for the most expensive equipment not wholly satisfactory results have uniformly been obtained.

Notwithstanding the many forms of equipment, none has heretofore employed the particular combination of elements provided by this invention, and which has been found to give results not heretofore obtainable, especially while maintaining the cost of the equipment at a relatively economical level.

According to this invention, it has now been found that a particular arrangement of diffusing and opalescent elements, in combination with a light directing element disposed therebetween, gives results far superior to the older equipment with regard to light uniformity, and thereby increases enlarger performance. Furthermore, in combination with a novel color filtration assembly of improved range and accuracy, also provided by the invention, entirely reliable enlarger apparatus is realized.

Other objects and advantages of the invention will appear from the following detailed description of a preferred embodiment thereof, reference being made to the accompanying drawings, of which:

FIG. 1 is a vertical cross sectional view taken through the center of the apparatus; and FIG. 2 is a partial horizontal cross sectional view taken at line 2—2 of FIG. 1.

Referring now to the drawings in detail, in the preferred embodiment of apparatus shown therein in schematic form, a frame 10 is made up of lower plate 11, upper plate 12, rear plate 13, mirror support web 14, and lamp support members 15, 16. These frame members are preferably welded together to form a unitary frame, but can be secured together in any other suitable manner, such as by screws or rivets.

Plates 11, 12 are flat and rectangular, plate 11 having a circular light opening 20 therethrough at its back portion, and plate 12 having a circular light opening 21 of the same size aligned above opening 20. Plate 13 is a solid web. Mirror support member 14 provides a beveled upper end surface 23 to which a polished metal mirror 24 is connected by screws 25 received into tapped openings in member 14. Mirror 24 has its polished mirror surface facing angularly downwardly at a 45° angle and aligned above openings 20, 21. Vertical web 15 secured to plate 12 and horizontal web 16 secured to the top of web 15 provide a base for socket 27 into which lamp 28 is received. Frame 29 carried on web 16 supports reflector 30 at the forward side of lamp 28 and condenser lens 31 at the opposite rearward side of lamp 28. Frame 29 has rearwardly extending webs 32, 33 at opposite sides of lens 31 and directed toward lens 24 between the ends of which is supported a heat shield 34.

A removable lamp housing 35 covers the elements above plate 12, including mirror 24 and lamp 28, and is open topped, having a cover 36 having spaced outer and inner edge flanges 37, 38, respectively, having a plurality of webs 39 therebetween which are disposed upon the upper edges of the housing 35, whereby to permit passage of air outwardly beneath the sides of the cover.

A tubular member 40 is connected at its lower end into opening 21 of plate 12. A "UV" (ultraviolet) filter 44 may be disposed to cover the upper end of tube 40 to remove ultraviolet radiation from the light beam. The rearward end of plate 16 is connected to tube 40 for support.

A light-tight frame housing 45 enshrouds the frame 10.

A bolt 47 is received through vertically aligned perforations in plates 11, 12 and is secured by nut 48. Sleeve bushing 52 is disposed about the bolt between plates 11, 12. A thin spacer 53 is disposed about the bushing upon plate 11. Three circular color filter discs 57, 58, 59 are rotatably disposed concentrically around bushing 52 and bolt 47. Circular spacer disc 61, 62, 63 of lesser diameter are respectively disposed above each of the filter discs 57, 58, 59. The discs 61, 62, 63 are of small enough diameter to not overlap openings 20, 21, but are large enough to stabilize the filter discs against tilting motions. The spacer discs are held by set screws on bushing 52 so as to be nonrotative in order to make the filter discs independently rotatable.

Each of the filter discs 57, 58, 59 has an arcuate opening 67, 68, 69, respectively, which is covered except for an end portion 70, 71, 72, respectively, with color filter material affixed by a plurality of screws 73, or in any other suitable manner. Filter 77 of disc 57 is yellow, filter 78 of disc 58 is cyan, filter 70 of disc 59 is magenta.

Disc 57 has an upwardly extending annular flange 80 therearound spaced slightly inwardly of its outer edge, and discs 58, 59 have identically disposed flanges 81, 82, respectively. Discs 58, 59 also have downwardly extending annular flanges 83, 84, respectively, which slightly spacedly inwardly overlap flanges 80, 81. Face plate 85 of frame 10 has a rectangular opening 86 through which edge portions of discs 57, 58, 59 extend. Opening 86 has upward end extensions 87, 88 through which flange 82 rotates, the skirt formation 89 being disposed therebetween. Flanges 80–84 and skirt 89 serve as light blocking elements at opening 86, permitting only minimal amounts of light to leave the interior of housing 45.

Housing 45 is secured to the underside of frame 10 by screws (not shown) engaging brackets 91, 92, 93, the brackets being screwed to the underside of plate 11 of the frame.

A cylindrical tube 95 is secured at its upper end into opening 20, and carries at its upper end a diffusion plate 96. Plate 96 may be a ground glass, or any other means for breaking up (scattering) the light against the interior sides of the tube. Ground surfaces reduce light passage and efficiency somewhat more than other means. Plates of glass or plastic having shaped surface formations (e.g. cones, pyramids, ribs) are suitable, and have high light passage efficiency. A short focal length lens may be used. A second cylindrical tube 97 is movably telescoped into tube 95, a set screw 98 holding the relative axial positions of the two tubes fixed to give the desired overall tube length. An opalescent plate 100 is carried over the lower end of tube 97. A single tube of fixed length may replace the two tubes 95, 97. Element 96 serves to scatter or deflect the light against the sides of tubes 95, 97 which must have sufficient length for that purpose.

The filters 77, 78, 79 are each preferably made to include serially disposed portions 77a–77e, 78a–78e, and 79a–79e, these portions of each filter having 1, 2, 3, 4, and 5 layers, respectively, of the filter medium. Only filter 79 is shown in FIG. 2, filters 77, 78 being the same. Opening portions 70, 71, 72 are each large enough to completely overlap the bores of tubes 40, 95, 97. Portions 77a–77e, 78a–78e, and 79a–79e may be arcuately less in length than the size of the tube openings, so that the individual filter portions will not completely overlap them, but portions of two filter portions will be over the openings. Nonetheless, because of the graduated filter densities, the correct amount of any filter color may be very accurately added to the light passing therethrough by proper rotational positioning of the particular filter disc. Single layer stepped density filter elements may be used instead of the multi-layer filter elements.

Filter calibrations are disposed upon the outer sides of flanges 80, 81, 82, and the filter discs, which are manually rotated at their edges projecting through opening 86, may be accurately positioned either according to the calibrations or according to direct light readings taken beneath the projector.

The color head which has been described is mounted with tubes 95, 97 disposed into opening 102 of lamphouse 103 of enlarger 104. The lower tube end is adjusted to its maximum effective position within the lamphouse. A negative carrier 105 disposed beneath the lamphouse carries a photographic color negative which is uniformly lighted in accurate color balance all over its surface by light emitted through opalescent plate 100. The printing paper, of course, is disposed upon an easel disposed upon base board 106 of the enlarger in making a print. Condenser lenses 107 are supported above the negative carrier. Enlarger lens 108 is supported at the proper place between carrier 105 and the printing paper to focus the image on the paper. The condenser lenses are omitted in some enlargers, e.g. so-called diffusion enlargers.

Tubes 95, 97 (or the single tube replacing them) are finished interiorly with a non-glossy coating or finish 110, such as dull white paint or sand-blasted aluminum, or the like. The particular arrangement of diffuser 96 and opalescent plate 100 with respect to the tubes or tube is important in achieving the desired results according to the invention. The diffuser scatters the light from lamp 28, after the light has been reflected 90° by mirror 24 and the proper color adjustments have been made by proper positioning of the filter discs 57, 58, 59, into the tubes, which, because of their interior finish, further diffuse (mix) the light before it reaches opalescent plate 100. The opalescent plate then smoothly and uniformly spreads the light within lamp house 103. The resulting color prints are superior to those heretofore possible, and the equipment is less costly than has heretofore been available for the same or lesser quality of results.

Mirror 24 is employed to reduce the overall height of the apparatus, and where desirable may be omitted and the light from lamp 28 passed directly downwardly into tube 40. Additional condenser lenses 31 may be employed if desired, or condenser 31 may be omitted if desired without seriously adversely affecting the superior performance of the apparatus.

The overall length of tubes 95, 97 (or the single tube alternatively used) is of importance, and should not ordinarily be less than about the size of diffuser 96 and opalescent plate 100, and preferably not less than about one and one half times the size of diffuser 96 and opalescent plate 100.

The cylindrical tube of the apparatus as described may be replaced by tubes of other cross sectional shapes, e.g. square or rectangular, and may vary somewhat in size from end to end.

While a preferred embodiment of the invention has been shown and described, many modifications thereof may be made by a person skilled in the art without departing from the spirit of the invention, and it is intended to protect by Letters Patent all forms of the invention falling within the scope of the following claims:

1. Photographic enlarger, comprising a light source, tubular means disposed to receive light from said light source at one end thereof, diffuser means disposed across said one end of said tubular means for scattering said light into said tubular means, opalescent means disposed across the other end of said tubular means, said tubular means forming a light path from said diffuser means to said opalescent means, means for supporting a photographic negative in the path of light issuing from said opalescent means, and lens means for directing an image of the illuminated photographic negative onto photographic paper.

2. The combination of claim 1, including, in series in the light path between said light source and said diffuser means, plural color filter means; and operating means for separately moving each said color filter means into at least a portion of the light path to contribute color thereto and for separately moving each said color filter means completely out of the light path.

3. The combination of claim 2, each said color filter means comprising serially adjacent mono- and multi-density filter portions, said operating means enabling movement of each said portion of each said color filter means across the light path to the desired extent.

4. The combination of claim 2, including light reflecting means and heat filter means each disposed in the light path between said light source and said diffuser means.

5. The combination of claim 1, including mirror means disposed to reflect said light passing from said light source to said diffuser means.

6. The combination of claim 1, including heat filter means disposed in the light path between said light source and said diffuser means.

7. The combination of claim 1, said tubular means being of cylindrical tubular form.

8. The combination of claim 7, the interior of said tubular means having a non-glossy finish.

References Cited by the Examiner

UNITED STATES PATENTS 2,794,365   6/1957   Baasner et al. _____ 88—24
3,077,140   2/1963   Simmon et al. _____ 88—24

NORTON ANSHER, *Primary Examiner.*

RICHARD A. WINTERCORN, *Assistant Examiner.*